(12) United States Patent  
Brandt

(10) Patent No.: US 6,674,497 B2
(45) Date of Patent: Jan. 6, 2004

(54) ELECTROOPTIC DISPLAY DEVICE

(75) Inventor: Peter Brandt, Aschaffenburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 10/331,089

(22) Filed: Dec. 26, 2002

(65) Prior Publication Data

US 2003/0098932 A1 May 29, 2003

Related U.S. Application Data

(63) Continuation of application No. 09/410,181, filed on Sep. 30, 1999, now Pat. No. 6,522,381.

(30) Foreign Application Priority Data

Oct. 2, 1998 (DE) .......................... 198 45 579

(51) Int. Cl.[7] ............................... G02F 1/1347
(52) U.S. Cl. ...................... 349/74; 349/11; 349/83; 345/5; 116/62.1; 116/62.3; 116/62.4; 368/242
(58) Field of Search ................ 349/11, 142, 83, 349/77, 74; 345/38, 40, 103, 4, 5; 116/62.3, 62.1, 62.4; D10/98, 124; D12/192; 368/82, 83, 84, 240, 241, 242; 968/575

(56) References Cited

U.S. PATENT DOCUMENTS

| 4,435,046 A | * | 3/1984 | Nishimura ................. 349/142 |
| 4,814,757 A | * | 3/1989 | Patterson et al. ............ 345/40 |
| 4,862,395 A | * | 8/1989 | Fey et al. .................. 702/146 |
| 4,968,930 A |   | 11/1990 | Grupp et al. |
| 5,537,236 A | * | 7/1996 | Young ........................ 349/139 |
| 5,781,872 A | * | 7/1998 | Konishi et al. ............... 701/36 |
| 5,793,451 A |   | 8/1998 | Brandt |
| 5,796,457 A |   | 8/1998 | Ukai |
| 6,522,381 B1 | * | 2/2003 | Brandt ........................ 349/142 |

FOREIGN PATENT DOCUMENTS

| DE | 4140415 | 6/1993 |
| DE | 19500668 | 7/1996 |
| DE | 19537666 | 4/1997 |
| DE | 19757545 | 6/1998 |
| DE | 19755470 | 9/1998 |
| EP | 0415292 | 3/1991 |
| EP | 0672892 | 9/1995 |
| EP | 0708353 | 4/1996 |
| GB | 2007882 | 5/1979 |
| GB | 2268304 | 1/1994 |
| WO | WO9312453 | 11/1992 |

* cited by examiner

Primary Examiner—Robert H. Kim
Assistant Examiner—Andrew Schechter
(74) Attorney, Agent, or Firm—Martin A. Farber

(57) ABSTRACT

A display device, in particular for a motor vehicle, having a pointer, a scale and an electrooptic display, it being possible to represent measured values on the scale in an analog fashion using the pointer, and at least one area of the electrooptic display being arranged along the movement path of the pointer. In order to provide a high level of information density while simultaneously making the display easy to read, the electrooptic display has a first display field which runs along at least one section of the movement path of the pointer and has display segments which can be actuated, and a second display field which can be actuated in an unrestricted way.

16 Claims, 2 Drawing Sheets

ELECTROOPTIC DISPLAY DEVICE

RELATED APPLICATION

This application is a continuation application of my application Ser. No. 09/410,181 filed Sep. 30, 1999, now U.S. Pat. No. 6,522,381 THE ENTIRE DISCLOSURE OF WHICH IS CONSIDERED AS BEING PART OF THE DISCLOSURE OF THIS CONTINUATION APPLICATION AND IS HEREBY INCORPORATED BY REFERENCE HEREIN IN ITS ENTIRETY.

FIELD AND BACKGROUND OF THE INVENTION.

The invention relates to a display device, in particular for a motor vehicle, having a pointer, a scale and an electrooptic display, it being possible to represent measured values on the scale in an analog fashion using the pointer, and at least one area of the electrooptic display being arranged along the movement path of the pointer.

Such display devices are known and are principally used in motor vehicles to display a travel speed or an engine speed. The electrooptic display has in such cases display segments with a defined, nonvariable shape. It is therefore not possible to represent any kind of information or graphics as desired.

Other known display devices having an analog pointer-type round instrument and a display over which said pointer passes in order to represent variable information have a large scale face which can be actuated, it being possible to actuate in a variable fashion all the display elements including the scale divisions and to represent them on the display. The size of the display face which can be actuated is a direct measurement of the fabrication costs of the display and thus of the display instrument, as a result of which these known display instruments are very expensive. Furthermore, the representation on the display is limited to a display mode which is made up of individual, approximately quadratic picture elements, as a result of which arcuate elements can only be represented in an approximated way and with incremental jumps which make the display more difficult to read. This is particularly disadvantageous in the case of display elements which are assigned to the (round) scale.

SUMMARY OF THE INVENTION

The invention is therefore based on the object of designing a display device of the aforementioned type in such a way that it provides an analog representation of measured values using a pointer instrument and an unlimited way of presenting information including displays on the electrooptic display which correspond to the scale, while at the same time the fabrication costs for the display device are low.

This object is achieved according to the invention in that the electrooptic display has a first display field which runs along at least one section of the movement path of the pointer and has display segments which can be actuated, and a second display field which can be actuated in an unrestricted way.

Thus, different types of representations can easily appear independently of one another on the two display fields. For example, the first display field can have defined display segments which are adapted to the geometry of the scale and of the movement path of the pointer. The first display field ensures that the measured values which are represented on the scale using the pointer, and further information which is visualized by actuating the display segments, can be read easily and reliably. The number of display segments of this display field may be comparatively low here, because only a limited number of geometries have to be represented. The adaptation of the display segments to the necessary geometries avoids undesired step increments in the representation. On the other hand, the second display field, which can be actuated in an unrestricted way, serves for the unrestricted representation of information. Here, for example graphics, such as route indications of an application system, video sequences or, in certain cases, warning signals, can be displayed. In this way, the display device according to the invention combines the possibility of representing various types of information in an unrestricted way with an instrument which can be read easily and reliably. This implements a high level of information density with, at the same time, a display which is easy to read.

It would be conceivable to use a cathode ray tube or a vacuum fluorescent display for the electrooptic display. However, the display device can be fabricated particularly cost-effectively and in large numbers if the electrooptic display advantageously has a liquid crystal display. In particular, when used in motor vehicles, the liquid crystal display provides further advantages, because it has only a low electric power drain and, by virtue of its flat design, requires only a small installation space.

The electrooptic display can be fabricated cost-effectively and easily if, in accordance with another advantageous development of the invention, the liquid crystal display is a TN or STN display. Such displays are additionally very operationally reliable and, in particular, STN displays are easy to read even with extreme viewing angles.

According to another advantageous development of the invention, the display has the first display field with display segments which can be actuated, and the second display field, which can be actuated in an unrestricted way, in the same display plane, with the result that, on the one hand, the number of production processes necessary to fabricate the display is low and, on the other hand, it is ensured that the two display fields can be read simultaneously in an easy, precise way, free from parallax.

The actuation of the electrooptic display can advantageously been simplified if it has two liquid crystal displays which are arranged optically in series. The first display field with segments which can be actuated is preferably arranged on a first of the liquid displays and the second display field, which can be actuated in an unrestricted way, is arranged on the second liquid crystal display. In this way, the displays can be designed in a way which has optimum adaptation to the different requirements, it being also possible largely to prevent them influencing one another electrically. In this way it is also easily possible to provide, for example, a display with a first display field which is adapted to a defined scale and has display segments which can be actuated, and to select the liquid crystal display which is arranged optically in series with said display and which has the second display field which can be actuated in an unrestricted way, either as a monochrome display or color display depending on the individual wishes and requirements.

A way of representing information in a particularly unrestricted way over a large area (for example to show a video film) which is particularly attractive if there is no representation on the first display field (for example when the vehicle is stationary), can preferably be obtained if the display fields overlap at least partially.

The necessary installation space for an electrooptic display which has two liquid crystal displays which are arranged optically in series is, according to another advantageous development of the invention, particularly small if the electrooptic display has a DSTN display.

A maximum, physical integration of the elements of the display can be achieved if the electrooptic display advantageously has a multilayer liquid crystal display having on a substrate at least two electrode layers, which are electrically separated from one another and can be actuated independently. Although it continues to be possible to represent a plurality of display fields with such a design, all that this requires is a single liquid crystal cell with one front wall and one rear wall, each fitted with electrodes, a liquid crystal substance being enclosed between the walls. In this context it is particularly favorable, and simplifies the design, if the first display field with display segments which can be actuated can be represented with a first of the electrode layers and the second display field, which can be actuated in an unrestricted way can be represented with the second electrode layer.

A particularly wide variety of information can be represented in an unrestricted way with the display device if the second display field, which can be actuated in an unrestricted way is preferably a dot matrix field which can be actuated using a multiplex method. Despite the possibility of actuating a large number of picture elements, the multiplex method requires only a comparatively low amount of structural work for the display device.

According to another advantageous development of the invention, the second display field, which can be actuated in an unrestricted way, can be actuated using an anti-aliasing method. This provides image smoothing which, in particular also when representing moving images—leads to a clear display and thus one which can be read and recognized better.

It is possible to conceive of representing dark characters on a light background on the electrooptic display, but this makes the display more difficult to read, in particular when there is low ambient light the large background surface can have a dazzling effect on a viewer. Since motor vehicles with display instruments which cannot be read so well also have the direct effect of also reducing traffic safety, such disadvantages must be avoided. It is therefore particularly advantageous if light characters can be represented on a dark display area using the electrooptic display.

A particularly good contrast between the characters represented and the rest of the display area forming the background of the display, and between said characters and the nonselected characters is advantageously achieved if nonselected display elements can be actuated with an actuation voltage (undershoot range) which has a minimum transmission. In this context, use is made of the effect experienced in liquid crystal cells, according to which an actuation voltage lying between an actuation voltage which gives rise to a high level of transmission and a nonactuation voltage which gives rise to a low level of transmission leads to a minimum level of transmission of the liquid crystal cell.

The pointer of the display device may, for example, execute a linear movement along a linear scale in order to display measured values. However, such a display device is difficult to read because the entire display region is difficult to perceive with one glance. Rapid assessment, necessary in particular in motor vehicles, of the relative magnitude of the displayed measured value is therefore only possible with difficulty. It is therefore of particular advantage if, according to another advantageous development of the invention, the movement path of the pointer describes a circular arc segment, and the entire display region of the pointer, together with the position of the pointer, can be perceived in a very short time.

According to another advantageous development of the invention, a travel speed can be displayed with the pointer, and a set value of a speed regulating system can be represented by actuating at least one display segment of the first display field. In this way, a mark or a band of display segments directly in the vicinity of the scale and of the movement path of the pointer can be used to represent the preset speed. Furthermore, important operational data of the vehicle such as fault messages or navigation instructions can be displayed on the second display field which can be actuated in an unrestricted way. In this way, the display device according to the invention provides a comprehensive way of representing information which can be read and absorbed easily by a vehicle driver, the possibility of him being distracted from the traffic situation being thus reduced to a minimum, unavoidable level.

BRIEF DESCRIPTION OF THE DRAWINGS

The invention is explained in more detail below with reference to exemplary embodiments which are represented in the appended drawing, in which.

DETAILED DESCRIPTION OF THE PREFERRED EMBODIMENT

Figure 1:
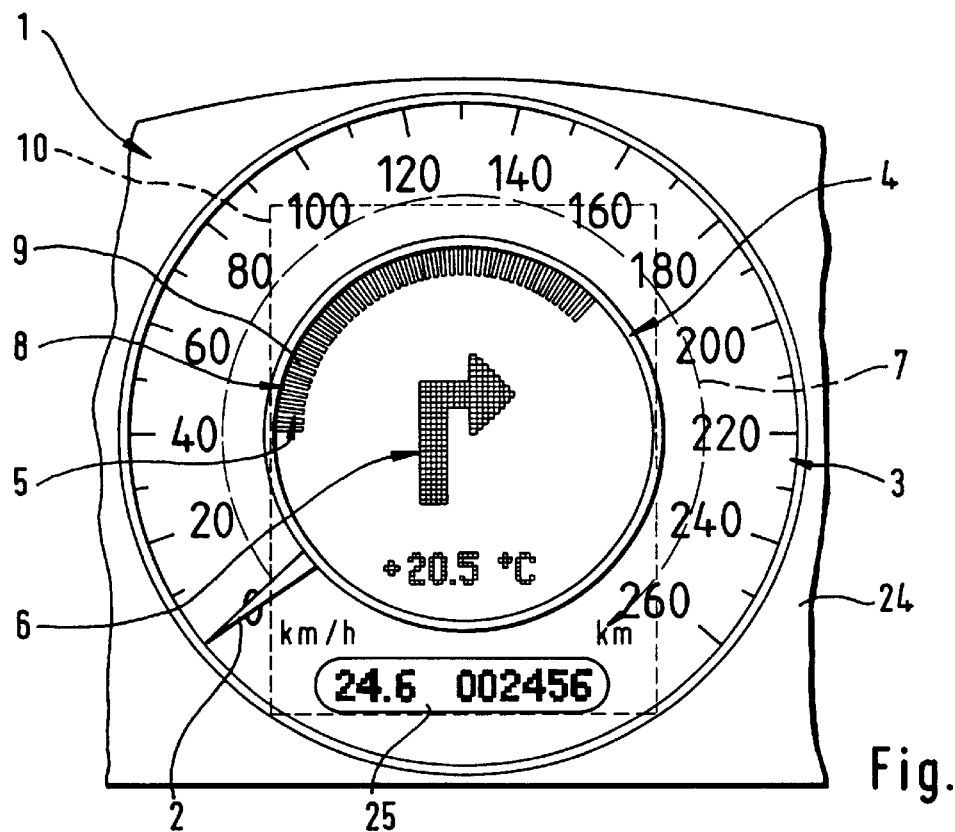
FIG. 1 shows a display device in a front view.

FIG. 1 shows a display device 1 which is a component of a combination instrument (not further represented here). The display device 1 has a circular-segment-shaped scale 3 on which a travel speed of the motor vehicle can be represented by means of a pointer 2 which can be pivoted along a movement path 7. The pointer 2 is embodied here as a disc pointer with transparent central region or as a ring pointer, and it is driven by means of the circumference of the disc or ring. The pointer drive is covered by a plate 24. An electrooptic display 4 which has a liquid crystal display 10, of which only a central area 8 is not covered by a dial 15 (FIG. 2) which has the scale 3, is arranged in the central area formed around the pivot axis of the pointer 2.

A first display field 5 with display segments 9, which can be actuated, of the electrooptic display 4 runs along the movement path 7 of the pointer 2. A preselected travel speed of a speed regulating system is represented in the first display field 5, which is formed by a belt of display segments 9. The start of the belt composed of actuated display segments 9 with a scale value of 40 km/h means that the speed regulating system can be activated starting from this lower limiting speed. The upper limiting value of approximately 175 km/h represents the preselected travel speed.

A further display field 6 of the electrooptic display 4 can be actuated in an unrestricted way and shows a route indicator symbol of a navigation system and an external temperature (+20.5° C.). In order to represent information in an unrestricted way, the second display field 6 is embodied as a dot matrix with picture elements which can be actuated individually. In a third display field 25, arranged in the lower region of the display device 1, there is a route display with an indication of the entire distance (2456 km) which has been covered and the distance (24.6 km) which has been covered from a selected point (for example the start of the journey).

Figure 2:
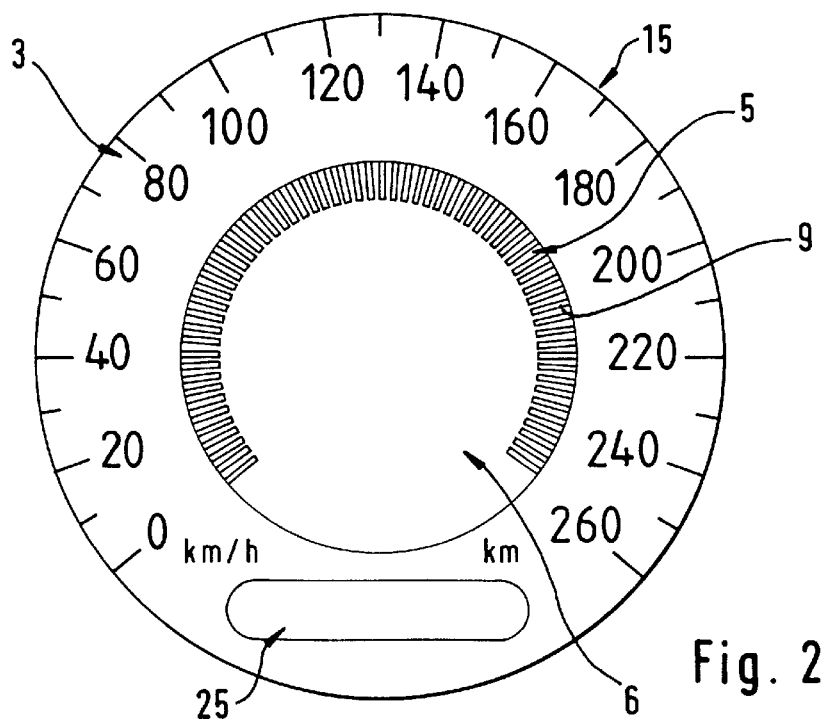
FIG. 2 shows a dial and display segments of the display device in a front view.

In order to clarify further, FIG. 2 shows the scale 3, which is embodied in a conventional way as a dial 15 in the form of a printed film, together with the fields 6, 25 which can be actuated in an unrestricted way, and the display field 5 which has display segments 9 which can be actuated. It is to be noted that the display segments 9 are arranged in such a way that display values between 0 and 260 km/h can be represented with them. Instead of the band which is represented in FIG. 1 and is formed by actuated display segments 9, it is also possible to actuate only individual display segments 9 which display the preselected travel speed of the speed regulating system. Moreover, the display segments 9 can for example, also be used to display the engine speed of the vehicle engine. In this case, not only the scale 3 but also a further scale which indicates engine speed values are provided.

According to the exemplary embodiment shown in FIGS. 1 and 2, a single liquid crystal display 10 is provided for the electrooptic display 4. As a result, the display area of the second display 6 which can be actuated in an unrestricted way is limited to a region which is not covered by the first display field 5. In order to increase the image area of the second display field 6, if representation is not necessary in the first display field (for example when the vehicle is stationary or when the speed regulating system is switched off), there is provision according to FIG. 3 for a first liquid crystal display 11 and a second liquid crystal display 12 for the electrooptic display to be arranged optically in series.

The first liquid crystal display 11 has here a first display field 5 with display segments 9 which can be actuated, and the second liquid crystal display 12 has a second display field 6, which can be actuated in an unrestricted way and is formed by a dot matrix. Electric connection and contact regions 26, 27 of the liquid crystal displays 11, 12 are not illustrated here in detail. The first liquid crystal display 11 is of particularly simple design because only a small number of image segments can be actuated directly. The second liquid crystal display 12 which is designed as a dot matrix display is actuated using a multiplex method.

Figure 3:
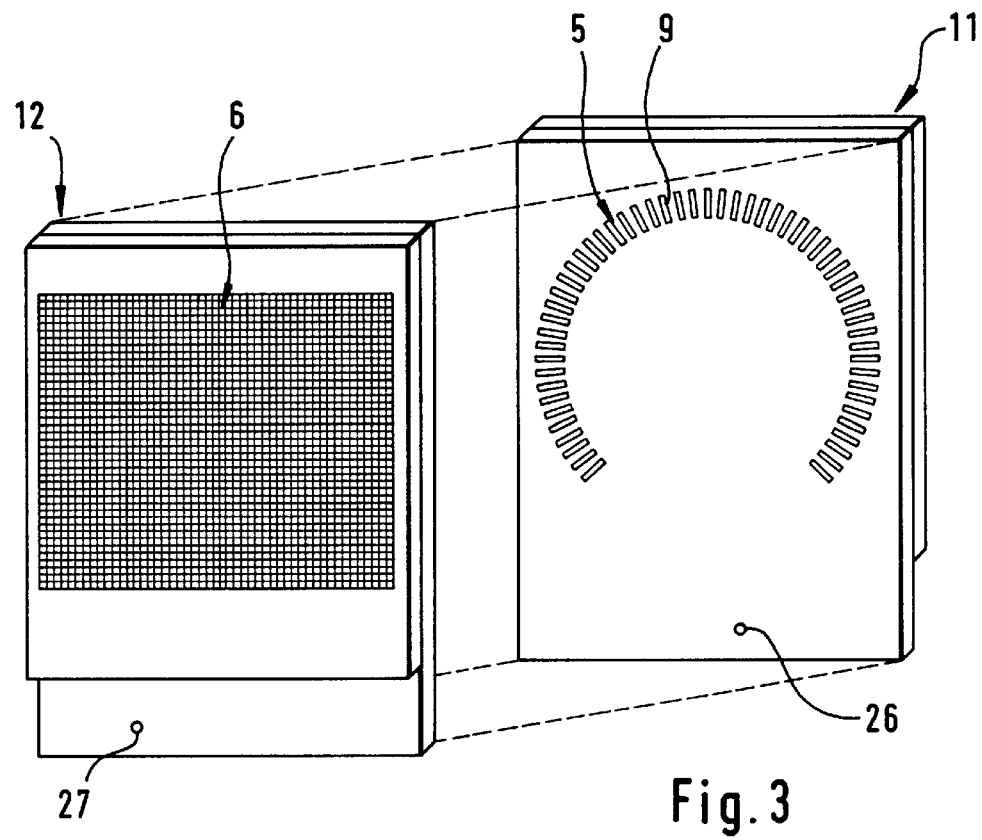
FIG. 3 shows two liquid crystal displays of an electrooptic display in a perspective view.
Figure 4:
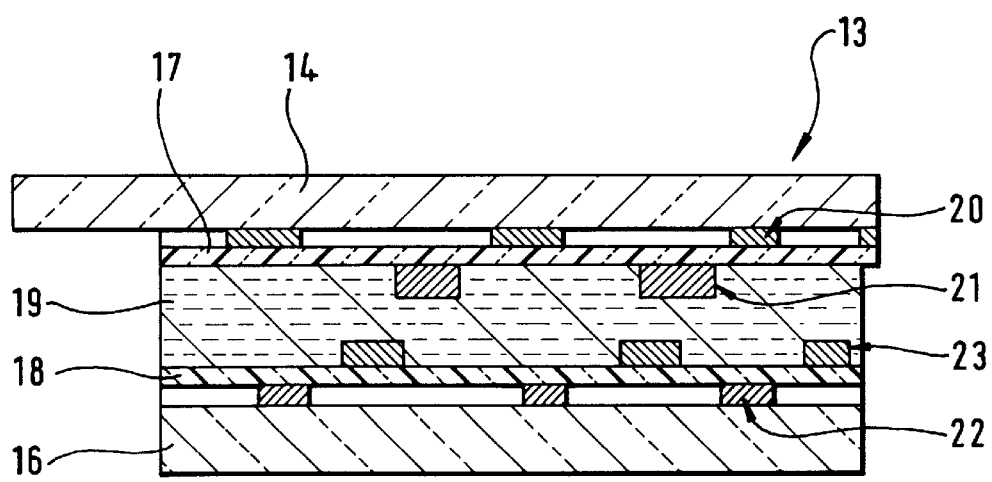
FIG. 4 shows a multilayer liquid crystal display in a sectional view.

Instead of the two displays 11, 12 in FIG. 3, it is possible, as illustrated in FIG. 4, to use a single multilayer liquid crystal display 13 for the electrooptic display. The display 13 has electrode layers 20, 21 which are provided on a front substrate 14, separated from one another by means of an insulation layer 17 and correspond to electrode layers 22, 23 which are mounted on a rear substrate 16 and are electrically separated from one another by an insulation layer 18. A liquid crystal substance 19 is enclosed between the front substrate 14 and the rear substrate 16. Liquid crystal substance which is located between respectively corresponding first electrode layers 20, 22 and second electrode layers 21, 23 can be actuated by applying voltage to selected electrodes.

I claim:

1. A display device, in particular for a motor vehicle, having a pointer, a scale and an electrooptic display, it being possible to represent measured values on the scale in an analog fashion using the pointer, and at least one area of the electrooptic display being arranged along the movement path of the pointer, wherein said electrooptic display (4) has a first display (5) which runs along at least one section of the movement path (7) of the pointer (2) and has display segments (9) which are actuatable, and a second display field (6) which is actuatable in an unrestricted way independently of the first display field, and wherein the pointer is a circumferentially driven pointer formed as a transparent disk or ring pointer encircling the electrooptic display.

2. A display device, in particular for a motor vehicle, having a pointer, a scale and an electrooptic display, it being possible to represent measured values on the scale in an analog fashion using the pointer, and at least one area of the electrooptic display being arranged along the movement path of the pointer, wherein said electrooptic display (4) has a first display field (5) which runs along at least one section of the movement path (7) of the pointer (2) and has display segments (9) which are actuatable, and a second display field (6) which is actuatable in an unrestricted way; wherein the pointer is a circumferentially driven pointer formed as a transparent disk or ring pointer encircling the electrooptic display; and wherein the electrooptic display (4) has two liquid crystal displays (11, 12) which are arranged optically in series.

3. The display device as claimed in claim 2, wherein each of said liquid crystal displays (10; 11, 12; 13) is a TN or STN display.

4. The display device as claimed in claim 2, wherein the first display field (5) with said segments (9) which are actuatable is arranged on a first of the liquid crystal displays (11), and the second display field (6), which is actuatable in an unrestricted way, is arranged on the second liquid crystal display (12).

5. The display device as claimed in claim 4, wherein said display fields (5, 6) overlap at least partially.

6. The display device as claimed in claim 2, wherein the electrooptic display (4) has a DSTN display.

7. The display device as claimed in claim 2, wherein the second display field (6), which is actuatable in an unrestricted way, is a dot matrix field which is actuatable using a multiplex method.

8. The display device as claimed in claim 2, wherein the second display field (6), which is actuatable in an unrestricted way, is actuatable using an anti-aliasing method.

9. The display device as claimed in claim 2, wherein light characters are representable on a dark display area using the electrooptic display (4).

10. The display device as claimed in claim 9, wherein nonselected display elements are actuatable with an actuation voltage (undershoot range) which has a minimum transmission.

11. The display device as claimed in claim 2, wherein the movement path (7) of the pointer (2) describes a circular arc segment.

12. The display device as claimed in claim 2, wherein a travel speed is displayable with the pointer (2), and wherein a set value of a speed regulating system is representable by actuating at least one display segment (9) of the first display field (5).

13. A display device, in particular for a motor vehicle, having a pointer, a scale and an electrooptic display, it being possible to represent measured values on the scale in an analog fashion using the pointer, and at least one area of the electrooptic display being arranged along the movement path of the pointer, wherein said electrooptic display (4) has a first liquid crystal display (11) having a first display field (5) which runs along at least one section of the movement path (7) of the pointer (2) and has defined display segments (9) which are adapted to the geometry of the scale and of the movement path of the pointer and which are actuatable for visualizing further information, and a second liquid crystal display (12) having a second display field (6) which is actuatable in an unrestricted way; and wherein said first liquid crystal display (11) and said second liquid crystal display (12) are arranged optically in series.

14. The display device as claimed in claim 13, wherein said second display field is a dot matrix having picture elements which are actuated individually.

15. The display device as claimed in claim 13, wherein the display segments (9) are able to selectively display an engine speed of the vehicle 16. The display device as claimed in claim 13, further comprising a second scale for displaying a second set of data.

* * * * *